US012479685B2

(12) United States Patent
Kotani

(10) Patent No.: US 12,479,685 B2
(45) Date of Patent: Nov. 25, 2025

(54) SHEET CONVEYING DEVICE CONVEYING SHEET EJECTED FROM IMAGE FORMING APPARATUS

(71) Applicant: KYOCERA Document Solutions Inc., Osaka (JP)

(72) Inventor: Takashi Kotani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 52 days.

(21) Appl. No.: 18/425,340

(22) Filed: Jan. 29, 2024

(65) Prior Publication Data

US 2024/0253933 A1 Aug. 1, 2024

(30) Foreign Application Priority Data

Jan. 31, 2023 (JP) ................................ 2023-012989

(51) Int. Cl.

| | |
|---|---|
| ***B65H 29/60*** | (2006.01) |
| ***B41J 15/04*** | (2006.01) |
| ***B65H 29/12*** | (2006.01) |
| *B41J 11/00* | (2006.01) |

(52) U.S. Cl.

CPC .............. *B65H 29/60* (2013.01); *B41J 15/04* (2013.01); *B65H 29/125* (2013.01); *B41J 11/002* (2013.01); *B65H 2301/332* (2013.01); *B65H 2701/11312* (2013.01)

(58) Field of Classification Search

CPC .... B65H 2301/332; B65H 2701/11312; B65H 2301/333; B65H 85/00; B65H 15/004; G03G 2215/00438; G03G 15/234

See application file for complete search history.

(56) References Cited

U.S. PATENT DOCUMENTS

| | | | | |
|---|---|---|---|---|
| 5,868,387 A * | 2/1999 | Kida | .................... | B65H 29/008 271/304 |
| 2013/0071167 A1 | 3/2013 | Nakamura et al. | | |
| 2020/0230977 A1 * | 7/2020 | Matsushima | .............. | B41J 2/01 |

FOREIGN PATENT DOCUMENTS

| | | |
|---|---|---|
| JP | 2013064911 A | 4/2013 |

* cited by examiner

*Primary Examiner* — Jeremy R Severson

(74) *Attorney, Agent, or Firm* — IP Business Soultions, LLC.

(57) ABSTRACT

A sheet conveying device includes: a sheet conveyance path that receives a long sheet conveyed from an image forming apparatus and allows the long sheet to be further conveyed; a turnover conveyance path that diverges from the sheet conveyance path, receives the long sheet conveyed from the sheet conveyance path to turn over the long sheet, and allows the turned-over long sheet to be further conveyed; a first shunt conveyance path that connects to the turnover conveyance path, has a circularly curved shape, and allows the long sheet conveyed from the turnover conveyance path to be shunted and switched back thereon; and a long-sheet conveyance path diverges from the turnover conveyance path connecting to the first shunt conveyance path and allows the long sheet switched back on the first shunt conveyance path to be conveyed toward a conveyance path leading to the image forming apparatus or an ejection device.

3 Claims, 6 Drawing Sheets

SHEET CONVEYING DEVICE CONVEYING SHEET EJECTED FROM IMAGE FORMING APPARATUS

INCORPORATION BY REFERENCE

This application claims priority to Japanese Patent Application No. 2023-012989 filed on Jan. 31, 2023, the entire contents of which are incorporated by reference herein.

BACKGROUND

The present disclosure relates to sheet conveying devices.

As a sheet conveying device capable of further conveying a sheet conveyed from an image forming apparatus, there is known a sheet conveying device that includes a linear sheet conveyance path and conveys a sheet on the sheet conveyance path.

SUMMARY

A technique improved over the aforementioned technique is proposed as one aspect of the present disclosure.

A sheet conveying device according to an aspect of the present disclosure includes a sheet conveyance path, a turnover conveyance path, a first shunt conveyance path, and a long-sheet conveyance path. The sheet conveyance path receives a long sheet conveyed from an image forming apparatus and allows the long sheet to be further conveyed on the sheet conveyance path. The turnover conveyance path diverges from the sheet conveyance path, receives the long sheet conveyed from the sheet conveyance path to turn over the long sheet, and allows the turned-over long sheet to be further conveyed on the turnover conveyance path. The first shunt conveyance path is formed to connect to the turnover conveyance path and have a circularly curved shape and allows the long sheet conveyed from the turnover conveyance path to be shunted and switched back on the first shunt conveyance path. The long-sheet conveyance path is formed to diverge from the turnover conveyance path connecting to the first shunt conveyance path and allows the long sheet switched back on the first shunt conveyance path to be further conveyed toward a conveyance path leading to the image forming apparatus or toward a conveyance path leading to an ejection device.

DETAILED DESCRIPTION

Figure 1:
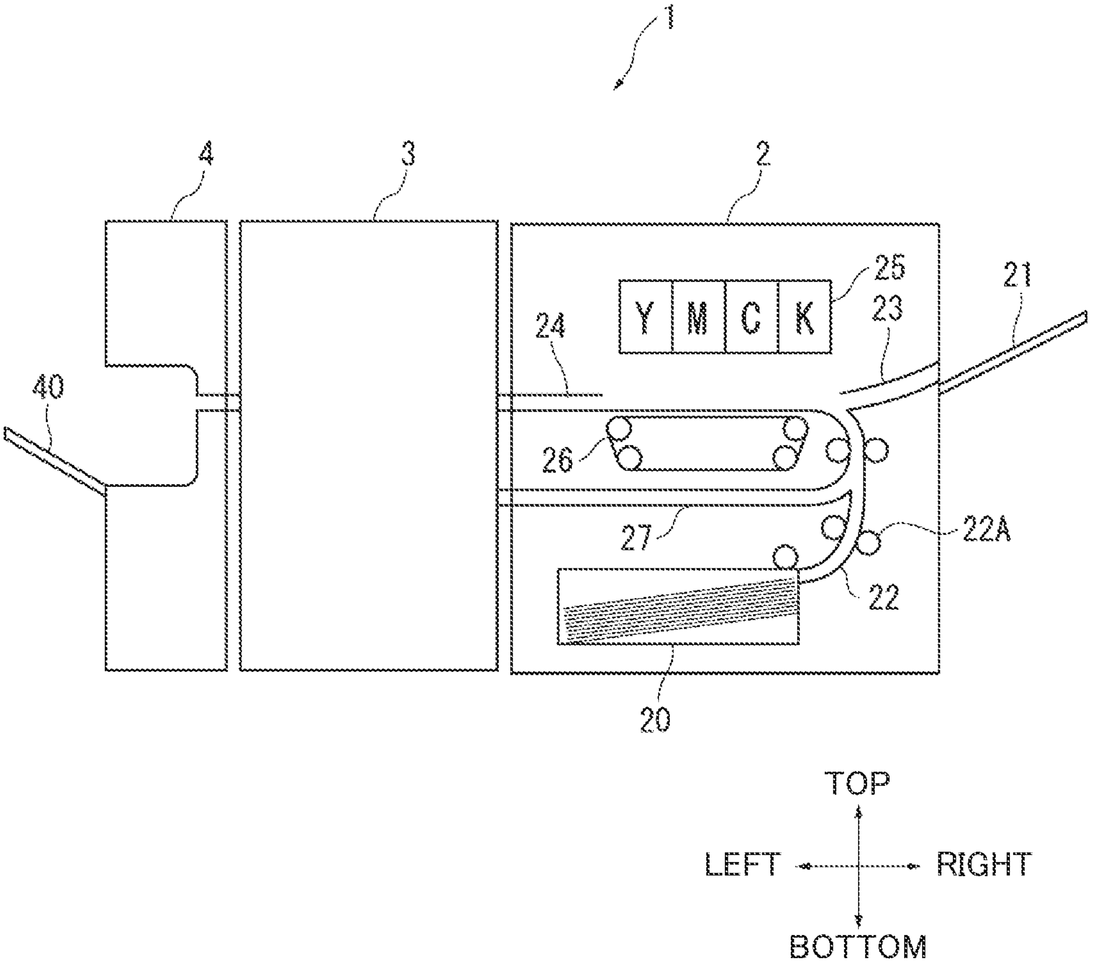
FIG. 1 is a view showing the structure of an image formation system including a sheet conveying device according to an embodiment.

Hereinafter, a description will be given of an embodiment of the present disclosure with reference to the drawings. Throughout the drawings, the same or equivalent parts and components are designated by the same reference characters and further description is omitted.

Figure 2:
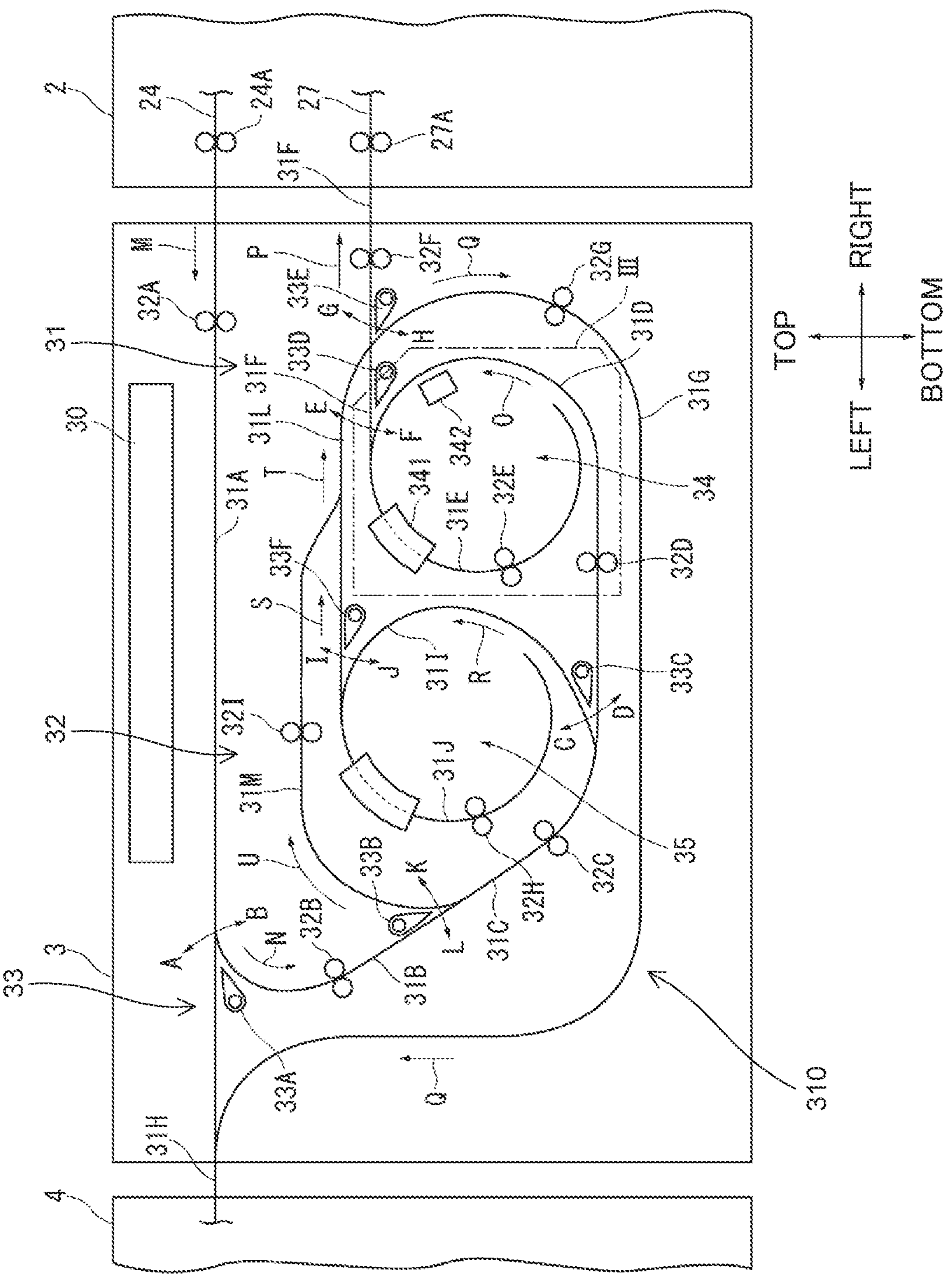
FIG. 2 is a view showing the structure of the sheet conveying device according to the embodiment.

First, an image formation system 1 will be described with reference to FIGS. 1 and 2. FIG. 1 is a view showing the structure of an image formation system including a sheet conveying device 3 according to this embodiment. FIG. 2 is a view showing the structure of the sheet conveying device 3 according to this embodiment.

As shown in FIG. 1, the image formation system 1 includes an image forming apparatus 2, the sheet conveying device 3, and an ejection device 4.

The sheet conveying device 3 is connected to the image forming apparatus 2. The ejection device 4 is connected to the sheet conveying device 3. The connection of the sheet conveying device 3 to the image forming apparatus 2 is made on the downstream side of the image forming apparatus 2 in a direction of sheet conveyance. The connection of the ejection device 4 to the sheet conveying device 3 is made on the downstream side of the sheet conveying device 3 in the direction of sheet conveyance.

The image forming apparatus 2 acquires image data from an original document or acquires image data from an external server, a cloud or a terminal. The image forming apparatus 2 forms an image on a sheet based on the image data and outputs the sheet. The image forming apparatus 2 may be an apparatus that combines a function to transmit and receive image data, a function to read images, and a function to form images. As an example, the image forming apparatus 2 has multiple functions, including a scanner, a printer, a copier, a telephone, and a facsimile machine.

The cloud is a system that provides computer resources via a computer network, such as the Internet, and, as an example, includes an application, a platform, and an infrastructure.

The server stores data and, upon request via a communication line, provides a requested piece of data.

The image forming apparatus 2 forms an image on a sheet. The image forming apparatus 2 includes a sheet feed device 20, a sheet feed device 21, a conveyance device 22, a conveyance device 23, a conveyance device 24, an image forming device 25, a conveying belt 26, and a double-sided conveyance path 27.

The sheet feed device 20 holds a stack of sheets and picks up and feeds a sheet from the stack. The sheet feed device 21 is mainly used in feeding a sheet by manual feeding. The conveyance device 22 conveys toward the image forming device 25 a sheet fed from the sheet feed device 20. The conveyance device 22 includes a conveyance roller 22A.

The conveyance device 23 conveys toward the image forming device 25 a sheet fed by manual feeding from the sheet feed device 21. The conveyance device 24 conveys a sheet to the sheet conveying device 3.

The image forming device 25 forms an image on a sheet by toner or ink. In the case where the image forming apparatus 2 forms an image electrophotographically, the image forming device 25 includes a photoconductor, a charging device, an exposure device, a developing device, a transfer device, a cleaning device, and a destaticizing device.

An example of the photoconductor is a photoconductive drum. The photoconductive drum has a photosensitive layer on the peripheral surface. Examples of the photoconductive drum include a selenium drum and an OPC (organic photoconductor).

The charging device charges the photosensitive layer of the photoconductor to a predetermined potential. An example of the charging device is a corona discharger.

The exposure device irradiates the photosensitive layer of the photoconductor with laser light to expose it to the laser light. The exposure device exposes the photosensitive layer of the photoconductor to light based on image data. As a result, an electrostatic latent image is formed on the photoconductor. An example of the exposure device is an LED (light-emitting diode).

The developing device contains, as an example, a two-component developer containing a carrier made of a magnetic material and a toner. The developing device develops the electrostatic latent image formed on the photoconductor by the toner, thus forming a toner image on the photoconductor. The transfer device transfers the toner image on the photoconductor to a sheet. The cleaning device cleans up residual toner remaining on the photoconductor after the transfer. The destaticizing device removes electrostatic charge from the photoconductor.

In the case where the image forming apparatus 2 is an inkjet printer, the image forming device 25 includes an ink cartridge, an ink tank, a pump, a head, nozzles, and an electrode. In this embodiment, the image forming apparatus 2 is an inkjet printer.

The ink cartridge or the ink tank stores, as an example, different types of water-based inks of different colors: Y (yellow), M (magenta), C (cyan), and Bk (black). The pump supplies ink from the ink tank to the head.

Multiple nozzles forming pixels are disposed on the head. Based on image data, ink of color according to the image data is supplied from the ink tank to the head. The ink is discharged through the nozzles toward a sheet.

The electrode includes, as an example, a charging electrode and a deflection electrode. The charging electrode applies charge to the ink discharged from the nozzles. The deflection electrode controls the direction of flight of the charged ink.

The conveying belt 26 is opposed to the nozzles of the head and conveys a sheet. Image is formed, by the ink discharged from the nozzles of the head, on the sheet being conveyed by the conveying belt 26.

The double-sided conveyance path 27 allows a sheet, which has been conveyed thereto with a printed surface face-up from the sheet conveying device 3, to be conveyed to the image forming device 25 with the non-printed surface of the sheet face-up (the printed surface face-down).

In the case where the image forming apparatus 2 forms an image electrophotographically, a fixing device may be disposed in the sheet conveying device 3. The fixing device applies heat and pressure to the toner image developed on the sheet to fix the toner image on the sheet. The fixing device includes, for example, a fixing roller, a heater, and a pressing roller.

The fixing roller is a hollow cylindrical roller. The fixing roller is pressed against the pressing roller. The pressing roller and the fixing roller form a nip between them. The pressing roller is driven into rotation by an unshown drive device and forms a nip together with the fixing roller to rotate the fixing roller.

The heater is supplied with power from an unshown power source to apply heat to the fixing roller. The heater is disposed in proximity to an inner peripheral surface of the fixing roller. The sheet conveyed to the fixing device is heated by the heater when passing through the nip and, thus, the toner image is fixed on the sheet.

As shown in FIG. 1, the ejection device 4 receives the sheet conveyed from the sheet conveying device 3 and ejects the sheet. The ejection device 4 may include an ejection tray 40 capable of holding ejected sheets.

Next, the sheet conveying device 3 according to this embodiment will be described with reference to FIGS. 3 to 5B in addition to FIG. 2.

Figure 3:
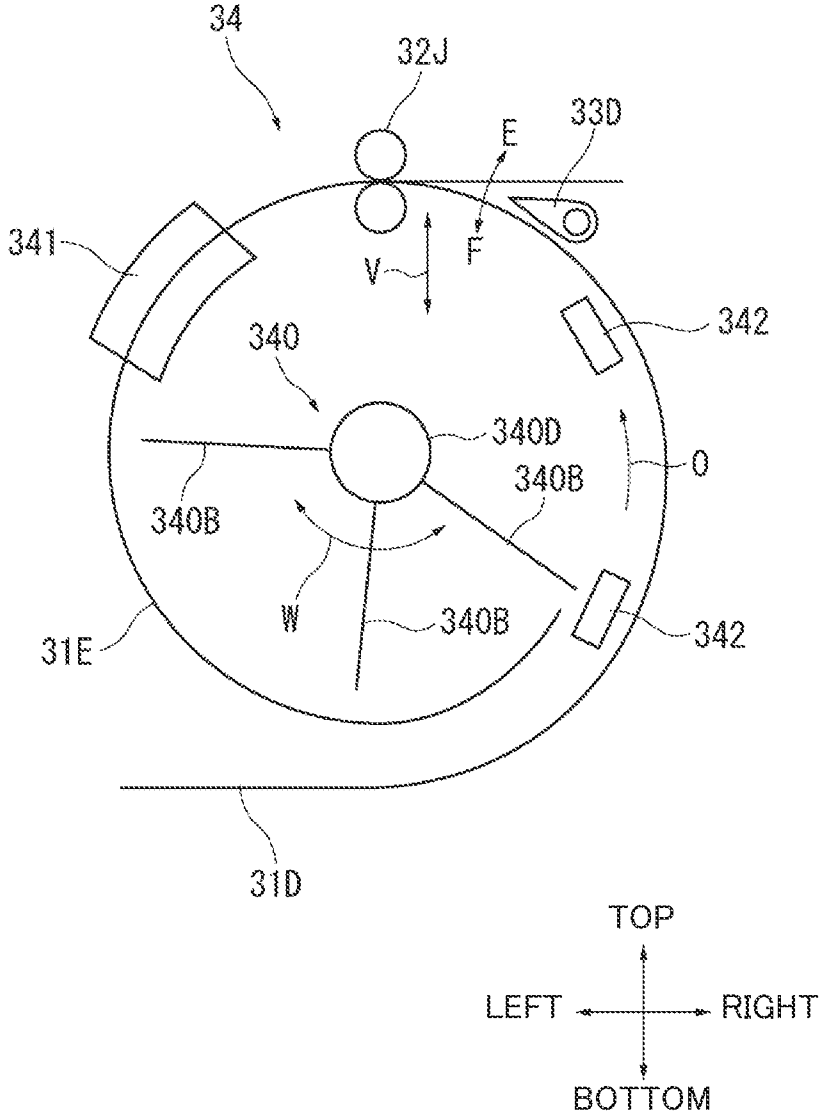
FIG. 3 is a view showing the structure of a first shunt conveyance path of the sheet conveying device.
Figure 4:
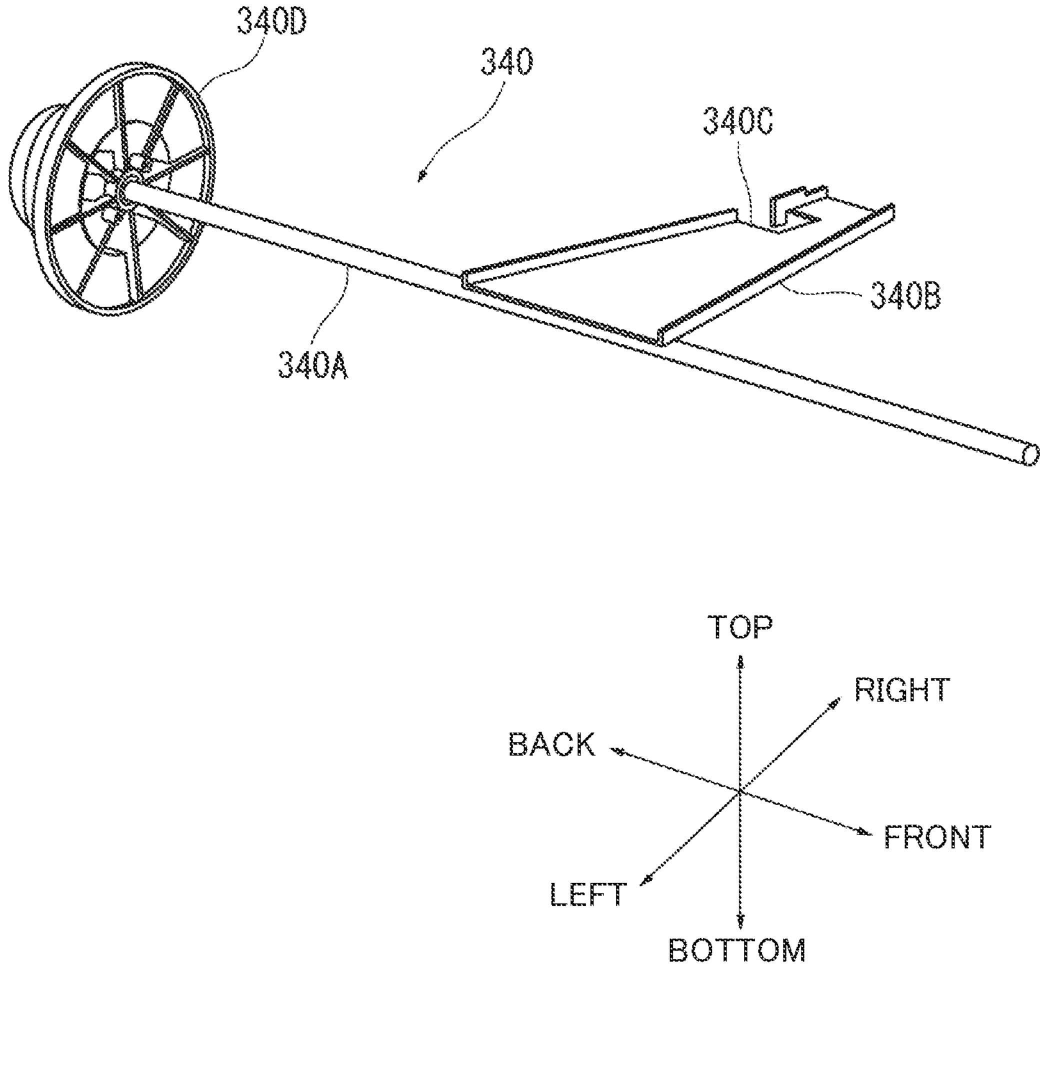
FIG. 4 is a view showing the structure of a stopper included in the sheet conveying device.
Figure 5A:
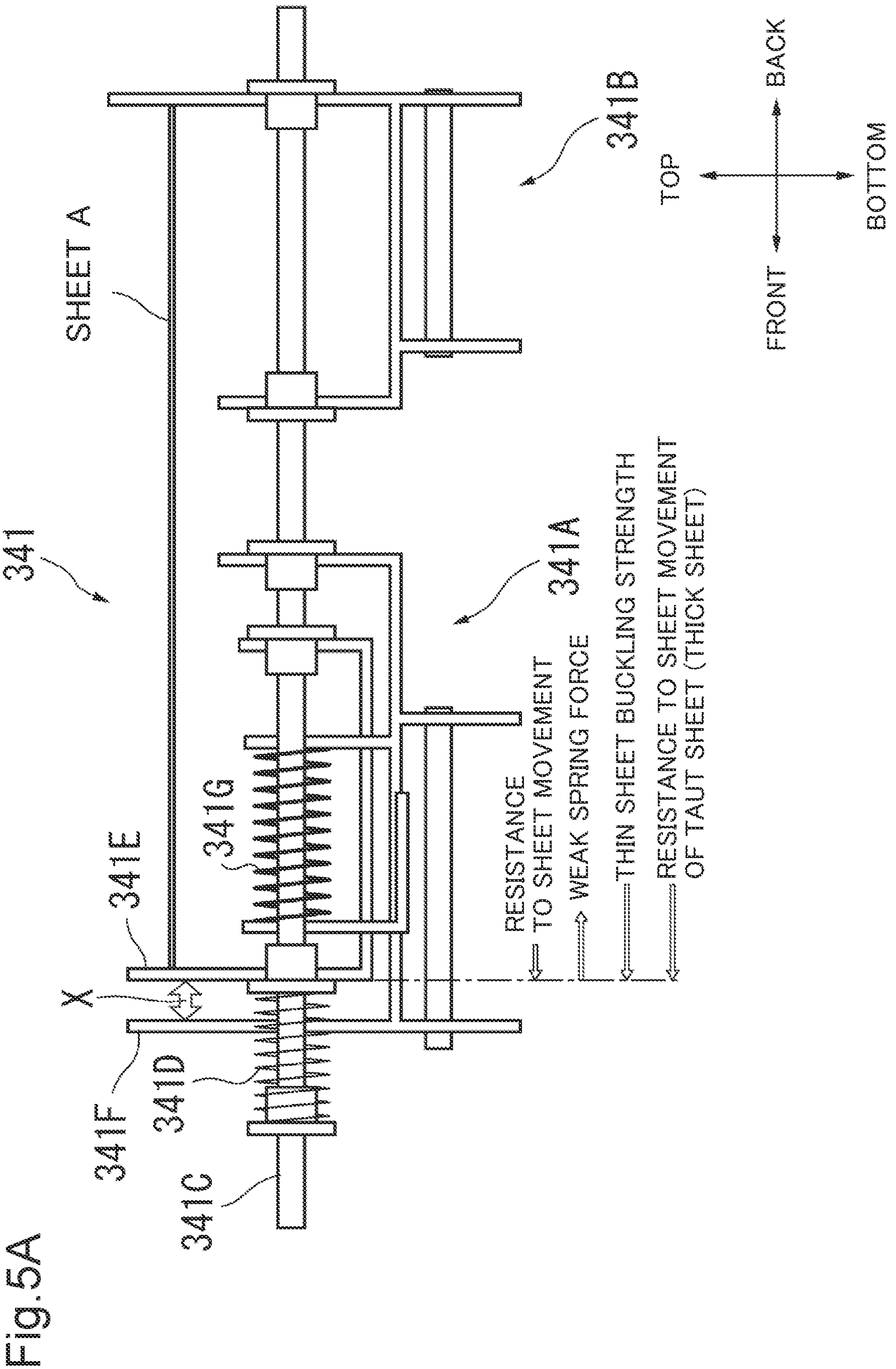
FIGS. 5A and 5B are views showing the structure of a width matching device included in the sheet conveying device.
Figure 5B:
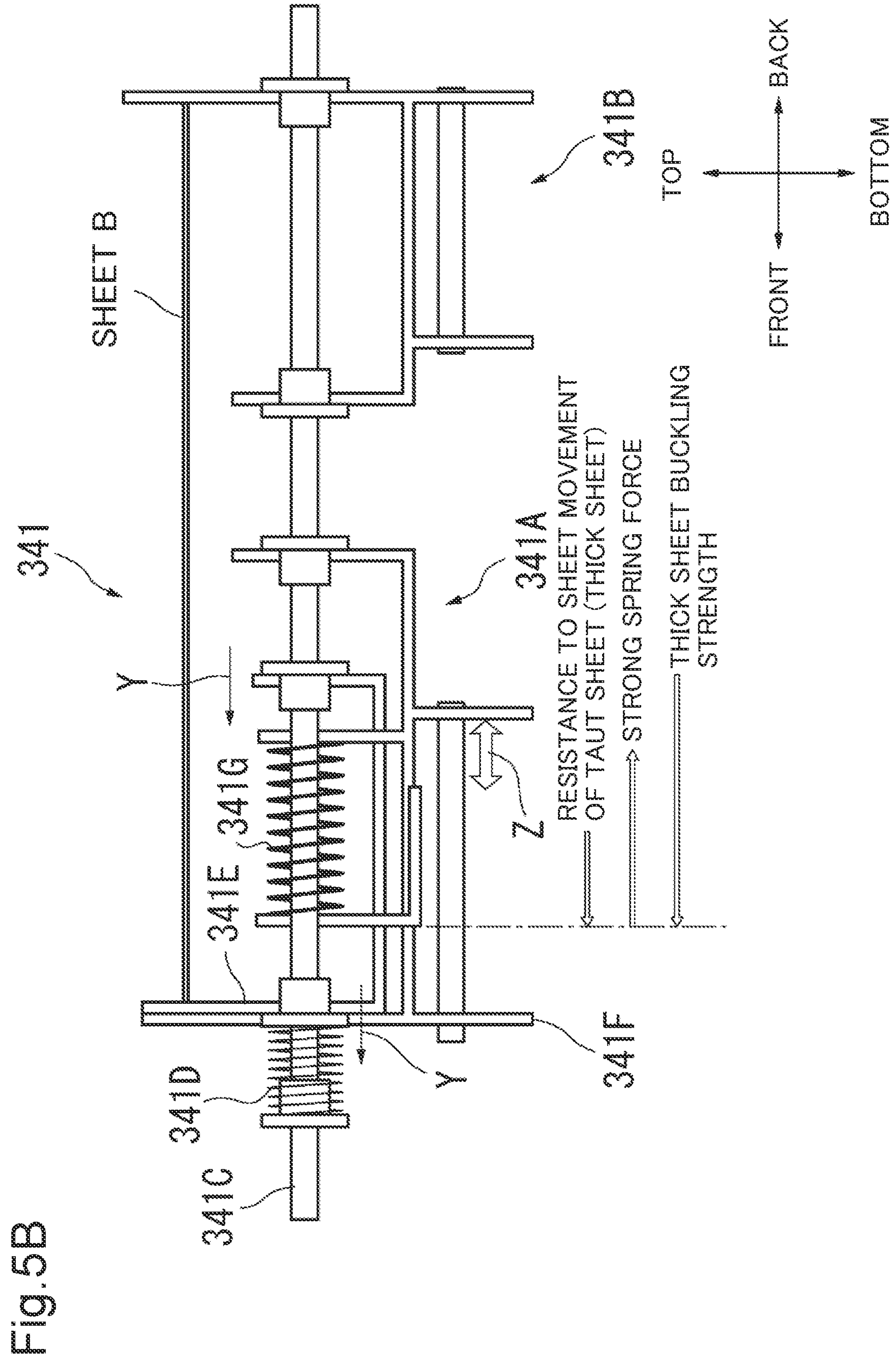

FIG. 3 is a view showing the structure of a first shunt conveyance path 31D and a first shunt conveyance path 31E of the sheet conveying device 3. FIG. 4 is a view showing the structure of a stopper 340 included in the sheet conveying device 3. FIGS. 5A and 5B are views showing the structure of a width matching device 341 included in the sheet conveying device 3.

As shown in FIG. 2, the sheet conveying device 3 includes a drying device 30, a conveyance device 31, a conveyance roller 32, a switching device 33, a first drum conveyance device 34, and a second drum conveyance device 35.

As shown in FIG. 2, the conveyance device 31 includes a sheet conveyance path 31A, a turnover conveyance path 31B, a turnover conveyance path 31C, a first shunt conveyance path 31D, a first shunt conveyance path 31E, a first U-turn conveyance path 31F, and an ejection conveyance path 310 (an ejection conveyance path 31G and an ejection conveyance path 31H).

A sheet conveyed from the image forming apparatus 2 to the sheet conveying device 3 is turned over by the sheet conveyance path 31A, the turnover conveyance path 31B, the turnover conveyance path 31C and so on and then conveyed toward the image forming apparatus 2.

The sheet conveyance path 31A is formed to extend in a direction M (to the left indicated by the arrow in FIG. 2) from the conveyance device 24 of the image forming apparatus 2. The sheet ejected from the conveyance device 24 of the image forming apparatus 2 is conveyed on the sheet conveyance path 31A in the direction M (to the left indicated by the arrow).

The turnover conveyance path 31B is formed to connect to the sheet conveyance path 31A and diverge in a direction N from the sheet conveyance path 31A, separately from the ejection conveyance path 31H. The sheet conveyed in the direction M on the sheet conveyance path 31A is conveyed in the direction N (as an example, to the lower right indicated by the arrow in FIG. 2) on the turnover conveyance path 31B.

The turnover conveyance path 31C is formed to connect to the turnover conveyance path 31B, pass by a location of a switching device 33B to be described hereinafter, and extend to a location of a switching device 33C to be described hereinafter. The turnover conveyance path 31C and the turnover conveyance path 31B are examples of the turnover conveyance path defined in CLAIMS. The sheet conveyed on the turnover conveyance path 31B is successively conveyed in the direction N (as an example, to the lower right indicated by the arrow in FIG. 2) on the turnover conveyance path 31C.

The first shunt conveyance path 31D and the first shunt conveyance path 31E are formed to connect to the sheet conveyance path 31A, the turnover conveyance path 31B, and the turnover conveyance path 31C. The first shunt conveyance path 31D and the first shunt conveyance path 31E are examples of the first shunt conveyance path defined in CLAIMS. The sheet turned over by and conveyed on the sheet conveyance path 31A, the turnover conveyance path 31B, and the turnover conveyance path 31C is conveyed to and shunted on the first shunt conveyance path 31D and the first shunt conveyance path 31E.

The first shunt conveyance path 31D is formed to connect at a location of a conveyance roller 32D to the turnover conveyance path 31C and extend in a direction of the arrow O (as an example, to the upper right indicated by the arrow in FIG. 2) to the first shunt conveyance path 31E. In this embodiment, a conveyance path from the location of the conveyance roller 32D to a location of a switching device 33D to be described hereinafter is the first shunt conveyance path 31D.

The first shunt conveyance path 31E connects at the location of the switching device 33D to the first shunt conveyance path 31D and extends in the direction of the arrow O. The first shunt conveyance path 31D and the first shunt conveyance path 31E form the first drum conveyance device 34. The first shunt conveyance path 31E extends to an end of the first drum conveyance device 34. The first shunt conveyance path 31E allows the sheet to be conveyed thereon in the direction of the arrow O, succeeding the first shunt conveyance path 31D.

The first U-turn conveyance path 31F is formed to diverge at the location of the switching device 33D from the first shunt conveyance path 31D and the first shunt conveyance path 31E. The first U-turn conveyance path 31F is a conveyance path portion from the location of the switching device 33D to the image forming apparatus 2.

When a sheet conveyed to the first drum conveyance device 34 is conveyed via the first shunt conveyance path 31D to the first shunt conveyance path 31E and the trailing end of the sheet reaches downstream of the location of the switching device 33D in the direction of sheet conveyance, the sheet fits within the first shunt conveyance path 31E and is shunted on the first shunt conveyance path 31E.

The sheet on the first shunt conveyance path 31E is switched back by a conveyance roller 32E and conveyed from the first shunt conveyance path 31E via the first U-turn conveyance path 31F toward the image forming apparatus 2.

The first shunt conveyance path 31D and the first shunt conveyance path 31E are circularly curved to have a drum-like shape as shown in FIG. 2.

In this embodiment, since the first shunt conveyance path 31D and the first shunt conveyance path 31E have a circularly curved shape (a drum-like shape), the first drum conveyance device 34 can be formed in a small size while ensuring the length of the conveyance path. Furthermore, since the first shunt conveyance path 31D and the first shunt conveyance path 31E have a circularly curved shape, the first drum conveyance device 34 can give body to a sheet having a stiffness smaller than a bending corrective force given by the circularly curved shape. In addition, as shown in FIG. 3, the first shunt conveyance path 31D and the first shunt conveyance path 31E are disposed below the sheet conveyance path 31A within a range of extension of the sheet conveyance path 31A. Therefore, the first shunt conveyance path 31D and the first shunt conveyance path 31E can be fitted in the housing of the sheet conveying device 3 without the need for a large space exceeding the length of the sheet conveyance path 31A in the right-and-left direction in FIG. 2 for the purpose of provision of the first shunt conveyance path 31D and the first shunt conveyance path 31E. Thus, the sheet conveying device 3 can be reduced in size.

The sheet conveying device 3 according to this embodiment can allow a sheet to make a U-turn back to the image forming apparatus 2 and enables duplex printing of the sheet.

The conveyance path 31 further includes, as shown in FIG. 2, an ejection conveyance path 310 (an ejection conveyance path 31G and an ejection conveyance path 31H), a second shunt conveyance path 31I, a second shunt conveyance path 31J, and a second U-turn conveyance path 31L.

The ejection conveyance path 310 (the ejection conveyance path 31G and the ejection conveyance path 31H) extends to the ejection device 4 disposed on the side of the sheet conveying device 3 opposite to the image forming apparatus 2 and is connected to the ejection device 4.

The ejection conveyance path 310 (the ejection conveyance path 31G and the ejection conveyance path 31H) is formed to connect to the first shunt conveyance path 31E and diverge from the first shunt conveyance path 31E separately from the first U-turn conveyance path 31F, receives a switched-back sheet from the first shunt conveyance path 31E, and allows the sheet to be conveyed toward the ejection device 4. Furthermore, the ejection conveyance path 310 is also formed to connect to the second U-turn conveyance path 31L and diverge from the second U-turn conveyance path 31L separately from the first U-turn conveyance path 31F, receives a sheet switched back by the second drum conveyance device 35 from the second U-turn conveyance path 31L, and allows the sheet to be conveyed toward the ejection device 4.

In other words, the first U-turn conveyance path 31F diverges, at the location of a switching device 33E to be described hereinafter, into a portion of the first U-turn conveyance path 31F extending to the image forming apparatus 2 and the ejection conveyance path 31G.

The ejection conveyance path 31G connects to the ejection conveyance path 31H. The ejection conveyance path 31H is formed to extend toward the ejection device 4 shown in FIG. 1. The ejection conveyance path 31G (a portion of the ejection conveyance path 310) has a circular shape having the same curvature as the first shunt conveyance paths 31D and 31E.

In this embodiment, a sheet can be suitably ejected to the ejection device 4 while using the first drum conveyance device 34 and the switching device 33.

The second drum conveyance device 35 is formed of the second shunt conveyance path 31I, the second shunt conveyance path 31J, and the second U-turn conveyance path 31L.

The second shunt conveyance path 31I is formed to connect to the turnover conveyance path 31C and diverges at the location of the switching device 33C from the turnover conveyance path 31C separately from the first shunt conveyance path 31D. The second shunt conveyance path 31I allows the sheet conveyed on the sheet conveyance path 31A, the turnover conveyance path 31B, and the turnover conveyance path 31C to be shunted on the second shunt conveyance path 31I.

The second U-turn conveyance path 31L is formed to diverge at the location of a switching device 33F to be described hereinafter from the second shunt conveyance path 31J.

The second U-turn conveyance path 31L allows the sheet switched back on the second shunt conveyance path 31J to be conveyed toward the image forming apparatus 2.

The ejection conveyance path 31G and the ejection conveyance path 31H connect at the location of the switching device 33E to the second U-turn conveyance path 31L. At this location, the second U-turn conveyance path 31L diverges into the ejection conveyance path 31G and the first U-turn conveyance path 31F.

The ejection conveyance path 31G and the ejection conveyance path 31H allow the sheet switched back on the second shunt conveyance path 31J and conveyed on the second U-turn conveyance path 31L to be conveyed toward the ejection device 4.

The second shunt conveyance path 31I and the second shunt conveyance path 31J are circularly curved to have a drum-like shape as shown in FIG. 2.

In this embodiment, since not only the first drum conveyance device 34 is formed in a drum-like shape by the first shunt conveyance path 31D and the first shunt conveyance path 31E but also the second drum conveyance device 35 is formed in a circularly curved shape (drum-like shape) by the second shunt conveyance path 31I and the second shunt conveyance path 31J, the second drum conveyance device 35 can be formed in a small size while further ensuring the length of the conveyance path. In addition, as shown in FIG. 3, the second shunt conveyance path 31I and the second shunt conveyance path 31J are disposed below the sheet conveyance path 31A within a range of extension of the sheet conveyance path 31A. Therefore, the second shunt conveyance path 31I and the second shunt conveyance path 31J can be fitted in the housing of the sheet conveying device 3 without the need for a large space exceeding the length of the sheet conveyance path 31A in the right-and-left direction in FIG. 2 for the purpose of provision of the second shunt conveyance path 31I and the second shunt conveyance path 31J. Thus, both the first drum conveyance device 34 and the second drum conveyance device 35 can be disposed below the sheet conveyance path 31A within the range of extension of the sheet conveyance path 31A and, therefore, the sheet conveying device 3 can be further reduced in size.

The second drum conveyance device 35 can also give body to a sheet, like the first drum conveyance device 34.

In addition, when switching back or the like of a sheet is performed in combination of the first drum conveyance device 34 and the second drum conveyance device 35, the throughput of jobs per unit time can be increased as compared to the case of doing the same only with the first drum conveyance device 34 and, therefore, a high productivity can be achieved.

Next, the structure of the first drum conveyance device 34 will be described in further detail. The structure of the second drum conveyance device 35 is the same as that of the first drum conveyance device 34. Therefore, the following description is given only of the structure of the first drum conveyance device 34 and further description of the second drum conveyance device 35 is omitted.

As shown in FIGS. 3 and 4, the first drum conveyance device 34 of the sheet conveying device 3 includes a stopper 340 and an alignment device 342.

The stopper 340 includes a rotary shaft 340A and a stop plate 340B.

As shown in FIG. 4, the rotary shaft 340A is disposed at the center of the circular shape of the first shunt conveyance path 31D and extends in a sheet width direction orthogonal to the direction of sheet conveyance. The stop plate 340B extends from the rotary shaft 340A toward the first shunt conveyance path 31D and the first shunt conveyance path 31E and rotates simultaneously with the rotary shaft 340A.

As shown in FIG. 3, when the stop plate 340B is pushed by the leading end of a sheet being conveyed in the direction of sheet conveyance on the first shunt conveyance path 31D and the first shunt conveyance path 31E and thus rotates forward simultaneously with the rotary shaft 340A, the alignment device 342 detects that the stop plate 340B is present at a predetermined reference position where the stop plate 340B should be stopped. When detecting that the stop plate 340B is present at the reference position, the alignment device 342 sends a detection signal to an unshown control device that performs an overall operation control of the sheet conveying device 3. Upon receipt of the detection signal, the control device stops the conveyance of the sheet being performed by the conveyance roller 32E and so on.

The stop plate 340B waits for a sheet at a predetermined waiting position located upstream of the alignment device 342 in the direction of sheet conveyance, is then pushed by the leading end of the sheet being conveyed in the direction of sheet conveyance on the first shunt conveyance path 31D and the first shunt conveyance path 31E, and thus rotates forward simultaneously with the rotary shaft 340A. Therefore, the angle of rotation of the rotary shaft 340A is determined according to the length of the sheet in the direction of sheet conveyance.

Since in this embodiment, as described above, the control device stops, upon receipt of the detection signal, the conveyance of a sheet by the conveyance roller 32E and so on, it can be prevented that the sheet conveyed to the first drum conveyance device 34 falls from the first drum conveyance device 34.

As shown in FIGS. 5A and 5B, the sheet conveying device 3 further includes a width matching device 341.

FIG. 5A is a view showing the manner of the width matching device 341 when matching the width of a sheet A. FIG. 5B is a view showing the manner of the width matching device 341 when matching the width of a sheet B.

The width matching device 341 is provided in a portion of the first shunt conveyance path 31E (see FIG. 3) of the first drum conveyance device 34. The width matching device 341 may be provided in a portion of the second shunt conveyance path 31J (see FIGS. 2 and 3) of the second drum conveyance device 35.

The width matching device 341 includes a first cursor 341A, a second cursor 341B, a shaft 341C, a first spring 341D, a slider 341E, an adjuster 341F, and a second spring 341G.

While the sheet A or the sheet B does not yet reach the width matching device 341, the width matching device 341 waits for the coming of the sheet A or the sheet B with the distance between the first cursor 341A and the second cursor 341B extended.

The first cursor 341A, the second cursor 341B, the first spring 341D, the slider 341E, the adjuster 341E, and the second spring 341G are journaled on the shaft 341C movably in the axial direction of the shaft 341C.

The first spring 341D is a compression spring and is positioned and anchored at one end to the shaft 341C. The other end of the first spring 341D is anchored to the slider 341E.

The distance between the slider 341E and the adjuster 341F varies with involvement of the first spring 341D.

As shown in FIG. 5A, when a sheet A is conveyed and comes to the width matching device 341, the width matching device 341 moves the first cursor 341A and the second cursor 341B to match the width of the sheet A (the width thereof in a main scanning direction).

The first cursor 341A and the second cursor 341B move according to the resistance to sheet movement possessed by the sheet. The sheet A abuts against the slider 341E located between the adjuster 341F and the first cursor 341A while it provides a resistance to sheet movement in the width direction. The maximum distance between the slider 341E and the adjuster 341F is represented as X in FIG. 5A.

The sheet A possesses a buckling strength. The first spring 341D has a spring force larger than the resistance to sheet movement of the sheet A and extends or contracts by its spring force according to the buckling strength of the sheet A. The first spring 341D adjusts the distance between the slider 341E and the adjuster 341F according to the buckling strength of the sheet A (larger than the spring force). Specifically, the slider 341E is moved toward an end of the sheet A in the width direction (the direction orthogonal to the direction of sheet conveyance) by the spring force of the first spring 341D and then abuts against the end of the sheet A, but the movement of the slider 341A is stopped at the end of the sheet A by the buckling strength of the sheet A. Thus, the position of the sheet A in the width direction (the direction orthogonal to the direction of sheet conveyance) is matched by the spring force of the first spring 341D.

In this embodiment, since the buckling strength of the sheet A is larger than the spring force of the first spring 341D, the sheet A can be prevented from buckling.

Another example is described below. While a sheet B does not yet reach the width matching device 341, the width matching device 341 waits for the coming of the sheet B with the distance between the first cursor 341A and the second cursor 341B extended.

As shown in FIG. 5B, when the sheet B is conveyed and comes to the width matching device 341, the width matching device 341 moves the first cursor 341A and the second cursor 341B to match the width of the sheet B (the width thereof in a main scanning direction).

The first cursor 341A and the second cursor 341B move according to the resistance to sheet movement possessed by the sheet B.

The slider 341E moves against the spring force of the first spring 341D and is brought into abutment against the adjuster 341F by the resistance to sheet movement possessed by the sheet B.

The second spring 341G is a tension spring and has a larger spring constant than the first spring 341D. In other words, the second spring 341G has a stronger spring force than the first spring 341D.

The sheet B possesses a larger buckling strength than the sheet A. The second spring 341G has a strong spring force larger than the resistance to sheet movement of the sheet B and extends or contracts by its strong spring force according to the buckling strength of the sheet B. The second spring 341G adjusts the distance between the first cursor 341A and the second cursor 341B according to the buckling strength of the sheet B (larger than the strong spring force). Thus, the position of the sheet B in the width direction is matched by the strong spring force of the second spring 341G. Specifically, the slider 341E moves toward the adjuster 341F by the resistance to sheet movement of the sheet B, but the adjuster 341F pushes the sheet B across the slider 341E in the direction opposite to the direction of the arrow Y in FIG. 5B by the spring force of the second spring 341G, and thus the position of the sheet B in the width direction is matched.

In this embodiment, since the buckling strength of the sheet B is larger than the spring force of the second spring 341G, the sheet B can be prevented from buckling.

As shown in FIG. 2, in the case where the image forming apparatus 2 forms an image on a sheet using an ink-jet system, the sheet conveying device 3 further includes a drying device 30. An example of the drying device 30 is a heater. The drying device 30 is disposed beside each of the sheet conveyance path 31A, the turnover conveyance path 31B, and the turnover conveyance path 31C and dries an image-bearing surface of a sheet conveyed from the image forming apparatus 2.

In this embodiment, a printed surface of a sheet where an image is formed by ink can be dried, which prevents defacement of components of the sheet conveying device 3.

In this embodiment, even if different types of sheets having different buckling strengths are mixedly conveyed to the sheet conveyance device 3, the sheets can be stably conveyed on any of the sheet conveyance path 31A, the turnover conveyance path 31B, the turnover conveyance path 31C, the first shunt conveyance path 31D, the first shunt conveyance path 31E, the first U-turn conveyance path 31F, the second shunt conveyance path 31I, and the second shunt conveyance path 31J.

Next, a detailed description will be given of the conveyance of a sheet by the sheet conveying device 3 still with reference to FIGS. 1 to 5B.

As shown in FIG. 2, the conveyance roller 32 comprises, in addition to a conveyance roller 24A of the conveyance device 24, a conveyance roller 32A, a conveyance roller 32B, a conveyance roller 32C, a conveyance roller 32D, a conveyance roller 32E, a conveyance roller 32F, a conveyance roller 32G, a conveyance roller 32H, a conveyance roller 32I, and a conveyance roller 32J (see FIG. 3). The conveyance roller 32 further includes rotary drive sources, such as motors. By controlling the operation of the rotary drive sources by the unshown control device that performs the overall operation control of the sheet conveying device 3, the number of revolutions and the directions of rotation of the conveyance rollers are controlled.

The switching device 33 comprises a switching device 33A, a switching device 33B, a switching device 33C, a switching device 33D, a switching device 33E, and a switching device 33F. The switching device 33 further includes rotary drive sources, such as motors. By controlling the operation of the rotary drive sources by the above control device, the number of revolutions and the directions of rotation of the switching devices are controlled.

A sheet fed from the sheet feed device 20 or the sheet feed device 21 and ejected through the conveyance device 22 or the conveyance device 23 and the conveyance device 24 from the image forming apparatus 2 as shown in FIG. 1 is conveyed, as shown in FIG. 2, to the sheet conveying device 3 and then conveyed in the direction M on the sheet conveyance path 31A by the conveyance roller 24A.

The printed surface of the sheet conveyed in the direction of the arrow M by the conveyance roller 32A of the sheet conveying device 3 is dried by the drying device 30.

The switching device 33A is switchable between the side of the arrow A and the side of the arrow B. When the switching device 33A is switched to the side of the arrow B, the sheet is conveyed on the ejection conveyance path 31H and then ejected to the ejection device 4.

When the switching device 33A is switched to the side of the arrow A, the sheet is conveyed in the direction N on the turnover conveyance path 31B by the conveyance roller 32B.

The switching device 33B is switchable between the side of the arrow K and the side of the arrow L.

The switching device 33C is switchable between the side of the arrow C and the side of the arrow D.

When the switching device 33B is switched to the side of the arrow K and the switching device 33C is switched to the side of the arrow C, the sheet conveyed on the sheet conveyance path 31A, the turnover conveyance path 31B, and the turnover conveyance path 31C is conveyed to the first shunt conveyance path 31D and the first shunt conveyance path 31E of the first drum conveyance device 34 by the conveyance roller 32C, the conveyance roller 32D, and the conveyance roller 32E.

As shown in FIG. 3, the conveyance roller 32J is disposed on the first shunt conveyance path 31D and the first shunt conveyance path 31E of the first drum conveyance device 34 and is designed to allow the passage between the first shunt conveyance path 31D and the first shunt conveyance path 31E to be opened or closed by moving each of a pair of rollers constituting the conveyance roller 32J toward or away from each other in the direction of the arrow V.

The stopper 340 and the alignment device 342 are disposed inside the first drum conveyance device 34.

The sheet conveyed on the first shunt conveyance path 31D and the first shunt conveyance path 31E of the first drum conveyance device 34 abuts at the leading end thereof in the direction of sheet conveyance against the stopper 340, which prevents the sheet from falling from the first drum conveyance device 34.

As shown in FIG. 4, the stopper 340 includes the rotary shaft 340A, the stop plate 340B, a cutaway 340C, and an encoder 340D.

As shown in FIG. 3, the stopper 340 is rotatable in the direction of the two-headed arrow W by an unshown motor.

The alignment device 342 includes, as an example, a laser light transmitter and a laser light receiver.

Referring to FIG. 4, using the mechanism where the transmitter of the alignment device 342 emits laser light and the receiver thereof detects the passage of the laser light through the cutaway 340C of the stopper 340, the position of the stopper 340 can be aligned.

Furthermore, using the mechanism where the transmitter of the alignment device 342 emits laser light and the receiver thereof detects the passage of the laser light through the encoder 340D of the stopper 340, the angle of rotation of the stopper 340 can be adjusted. The stopper 340 changes the position according to the dimension of the sheet in the sub-scanning direction while rotating in the direction of the arrow W.

Next, a description will be given of switchback conveyance of a sheet for duplex printing. As shown in FIG. 3, the sheet having entered the first shunt conveyance path 31D and the first shunt conveyance path 31E of the first drum conveyance device 34 is stopped at the leading end thereof in the direction of sheet conveyance by the stopper 340 and the sheet is stopped at a location where the trailing end thereof in the direction of sheet conveyance has passed through the conveyance roller 32J.

As shown in FIG. 2, the switching device 33D is switchable between the side of the arrow E and the side of the arrow F. The switching device 33E is switchable between the side of the arrow G and the side of the arrow H. When the switching device 33D is switched to the side of the arrow F and the switching device 33E is switched to the side of the arrow H, the sheet is conveyed in the direction of the arrow P by the conveyance roller 32E, the conveyance roller 32J (see FIG. 3), and the conveyance roller 32F of the sheet conveying device 3 and the conveyance roller 27A of the image forming apparatus 2. Thus, the sheet is conveyed to the image forming apparatus 2.

The sheet having entered the image forming apparatus 2 is conveyed with its printed surface (the already image-formed surface) turned up, i.e., in a face-up position, on the double-sided conveyance path 27 by the conveyance rollers provided on the double-sided conveyance path 27.

As shown in FIG. 1, the sheet conveyed on the double-sided conveyance path 27 is turned over with the printed surface face-down in a location of the conveyance device 24 opposed again to the image forming device 25 and the image forming device 25 prints the surface of the sheet opposite to the printed surface. In this manner, the sheet is duplex printed by the image forming device 25.

The duplex-printed sheet is ejected with the later printed surface turned up and the previously printed surface turned down, i.e., in a face-down position, from the conveyance device 24 of the image forming apparatus 2, conveyed in the direction M (to the left indicated by the arrow) on the sheet conveyance path 31A of the sheet conveying device 3, and then ejected on the ejection conveyance path 31H shown in FIG. 2 to the ejection device 4.

Next, a description will be given of a manner of ejection of a sheet in a face-down position still with reference to FIG. 2.

When the sheet conveyed in a face-up position (with the already printed surface turned up) from the image forming apparatus 2 enters the first drum conveyance device 34, the sheet is switched back on the first shunt conveyance path 31E by the conveyance roller 32E.

At this time, as shown in FIG. 2, the switching device 33D is switched to the side of the arrow F and the switching device 33E is switched to the side of the arrow G. Thus, the conveyance roller 32E, the conveyance roller 32J (see FIG. 3), the conveyance roller 32G of the sheet conveying device 3 convey the sheet in the direction of the arrow Q from the first U-turn conveyance path 31F to the ejection conveyance path 31G and then to the second ejection conveyance path 31H. The sheet is faced down (the already printed surface is turned down) when passing the circular ejection conveyance path 31G. The sheet is ejected face-down to the ejection tray 40 of the ejection device 4.

Next, a description will be given of the second drum conveyance device 35 still with reference to FIGS. 2 and 3.

As an example, while the first drum conveyance device 34 performs switchback conveyance or the like, the second drum conveyance device 35 handles a next sheet concurrently.

When the switching device 33B is switched to the side of the arrow K, the switching device 33C is switched to the side of the arrow D, and the switching device 33F is switched to the side of the arrow I, the sheet conveyed on the sheet conveyance path 31A, the turnover conveyance path 31B, and the turnover conveyance path 31C is conveyed to the second shunt conveyance path 31I and the second shunt conveyance path 31J of the second drum conveyance device 35 by the conveyance roller 32C and the conveyance roller 32H.

First, a description will be given of switchback conveyance of the sheet for duplex printing. The sheet conveyed in a face-up position on the second shunt conveyance path 31I and the second shunt conveyance path 31J of the second drum conveyance device 35 is switched back on the second shunt conveyance path 31J by the conveyance roller 32H.

At this time, as shown in FIG. 2, when the switching device 33F is switched to the side of the arrow J, the conveyance roller 32H of the sheet conveying device 3 conveys the sheet in the direction of the arrow S and the direction of the arrow T. Furthermore, when the switching device 33E is switched to the side of the arrow H, the sheet is conveyed toward the image forming apparatus 2 by the conveyance roller 32F. When the sheet is conveyed to the image forming apparatus 2, the conveyance roller 27A conveys the sheet in the direction of the arrow P. The sheet conveyed on the double-sided conveyance path 27 in the image forming apparatus 2 is turned over with the printed surface face-down in a location of the conveyance device 24 opposed again to the image forming device 25 and the image forming device 25 prints the surface of the sheet opposite to the printed surface. In this manner, the sheet is duplex printed by the image forming device 25.

Next, a description will be given of a manner of ejection of a sheet in a face-down position still with reference to FIG. 2.

The sheet conveyed in a face-up position on the second shunt conveyance path 31I and the second shunt conveyance path 31J of the second drum conveyance device 35 is switched back on the second shunt conveyance path 31J by the conveyance roller 32H.

At this time, as shown in FIG. 2, when the switching device 33F is switched to the side of the arrow J and the switching device 33E is switched to the side of the arrow G, the conveyance roller 32H and the conveyance roller 32G convey the sheet in the direction of the arrow Q from the second U-turn conveyance path 31L to the ejection conveyance path 31G and then to the second ejection conveyance path 31H. Thus, the sheet in a face-down position is ejected to the ejection device 4.

Next, a description will be given of duplex printing processing and face-down conveyance processing of a long sheet still with reference to FIG. 2.

The sheet conveying device 3 receives and conveys not only a sheet formed of a standard-size recording paper sheet conveyed from the image forming apparatus 2 but also a long sheet longer in the direction of sheet conveyance than the standard-size sheet. Also when the sheet conveying device 3 receives and conveys a long sheet, the first shunt conveyance path 31D and the first shunt conveyance path 31E form a first drum conveyance device 34 and the second shunt conveyance path 31I and the second shunt conveyance path 31J form a second drum conveyance device 35. Then, the sheet conveying device 3 switches back the received long sheet and then conveys the long sheet toward the image forming apparatus 2.

The long sheet conveyed from the image forming apparatus 2 is conveyed to the turnover conveyance path 31C, the first shunt conveyance path 31D, and the first shunt conveyance path 31E of the conveyance device 31 and shunted on the turnover conveyance path 31C, the first shunt conveyance path 31D, and the first shunt conveyance path 31E in preparation for switchback.

A long-sheet conveyance path 31M is formed to diverge at a location of the switching device 33B from the turnover conveyance path 31C connecting to the first shunt conveyance path 31D and conveys the long sheet, which has been switched back on the first shunt conveyance path 31D, toward the conveyance path leading to the image forming apparatus 2 or the conveyance path leading to the ejection device 4 (the second U-turn conveyance path 31L and the first U-turn conveyance path 31F or the ejection conveyance path 31G). A portion of the long-sheet conveyance path 31M and a portion of the turnover conveyance path 31C preferably have a circular shape of the same curvature as the first shunt conveyance paths 31I and 31J.

In this embodiment, since, as described above, the first shunt conveyance path 31D and the first shunt conveyance path 31E have a circular shape (drum-like shape), the sheet conveyance device 3 can be reduced in size while ensuring the length of the conveyance path also for use in switchback conveyance of a long sheet.

Furthermore, a long sheet conveyed on the turnover conveyance path 31C can also be conveyed to the second shunt conveyance path 31I and the second shunt conveyance path 31J both formed to diverge from the turnover conveyance path 31C and can be shunted on the second shunt conveyance path 31I, the second shunt conveyance path 31J, and a portion of the turnover conveyance path 31C in preparation for switchback.

The long-sheet conveyance path 31M allows the long sheet switched back on the second shunt conveyance path 31I and the second shunt conveyance path 31J and conveyed on the turnover conveyance path 31C to be conveyed on the long-sheet conveyance path 31M.

The second shunt conveyance path 31I and the second shunt conveyance path 31J have a circular shape (drum-like shape).

In this embodiment, a long sheet can be switched back using (i) a combination of the turnover conveyance path 31C, the first shunt conveyance path 31D, and the first shunt conveyance path 31E or (ii) a combination of the turnover conveyance path 31C, the second shunt conveyance path 31I, and the second shunt conveyance path 31J. Therefore, the throughput of jobs per unit time can be increased in terms of switchback of a long sheet as compared to the case where only one of (i) and (ii) is provided and, thus, a high productivity can be achieved.

The first U-turn conveyance path 31F and the second ejection conveyance path 31G are formed to diverge from the long-sheet conveyance path 31M.

The first U-turn conveyance path 31F allows the long sheet conveyed on the long-sheet conveyance path 31M to be conveyed toward the image forming apparatus 2.

The second ejection conveyance path 31G and the second ejection conveyance path 31H allow the long sheet conveyed on the long-sheet conveyance path 31M to be conveyed toward the ejection device 4.

In this embodiment, also as for a long sheet, its duplex printing and ejection to the ejection device 4 can be suitably performed and can consist with high productivity.

A long sheet can be classified, as an example, into a very long sheet and a medium long sheet shorter in the direction of sheet conveyance than the very long sheet.

Assume that, for example, a very long sheet is conveyed on the turnover conveyance path 31C and shunted on the turnover conveyance path 31C and the first drum conveyance device 34. In this case, the trailing end of the very long sheet in the direction of sheet conveyance comes to the turnover conveyance path 31C side of the location of the switching device 33B.

Specifically, the total length of the turnover conveyance path 31C, the first shunt conveyance path 31D, and the first shunt conveyance path 31E in the direction of sheet conveyance is longer than the total length of the turnover conveyance path 31C, the second shunt conveyance path 31I, and the second shunt conveyance path 31J in the direction of sheet conveyance.

Therefore, a medium long sheet is conveyed to and shunted on the turnover conveyance path 31C, the second shunt conveyance path 31I, and the second shunt conveyance path 31J.

First, a description will be given of switchback conveyance of a very long sheet for duplex printing.

When the switching device 33B is switched to the side of the arrow K and the switching device 33C is switched to the side of the arrow C, a very long sheet is conveyed from the sheet conveyance path 31A through the turnover conveyance path 31B to the turnover conveyance path 31C, the first shunt conveyance path 31D, and the first shunt conveyance path 31E. The very long sheet conveyed face-up to the first shunt conveyance path 31E of the first drum conveyance device 34 is switched back on the first shunt conveyance path 31E by the conveyance roller 32E.

Then, when the switching device 33B is switched to the side of the arrow L, the very long sheet is conveyed in the direction of the arrow U on the long-sheet conveyance path 31M by the conveyance roller 32D, the conveyance roller 32C, and the conveyance roller 32I.

Furthermore, when the switching device 33E is switched to the side of the arrow H, the very long sheet is conveyed toward the image forming apparatus 2 by the conveyance roller 32F. In the image forming apparatus 2, the conveyance roller 27A conveys the very long sheet in the direction of the arrow P. Thus, duplex printing can be achieved on the image forming apparatus 2.

Next, a description will be given of a manner of ejection of a very long sheet in a face-down position still with reference to FIG. 2.

The very long sheet conveyed face-up to the first shunt conveyance path 31E of the first drum conveyance device 34 is switched back on the first shunt conveyance path 31E by the conveyance roller 32E. As shown in FIG. 2, when the switching device 33B is switched to the side of the arrow L, the very long sheet is conveyed in the direction of the arrow U on the long-sheet conveyance path 31M by the conveyance roller 32D, the conveyance roller 32C, and the conveyance roller 32I.

Furthermore, when the switching device 33E is switched to the side of the arrow G, the conveyance roller 32G conveys the very long sheet in the direction of the arrow Q from the second U-turn conveyance path 31L to the ejection conveyance path 31G and then the second ejection conveyance path 31H. Thus, the very long sheet in a face-down position is ejected to the ejection device 4.

Next, a description will be given of duplex printing processing and face-down conveyance processing of a medium long sheet still with reference to FIG. 2.

Assume that, for example, a medium long sheet is conveyed on the turnover conveyance path 31C and shunted on the turnover conveyance path 31C and the second drum conveyance device 35. In this case, the trailing end of the medium long sheet in the direction of sheet conveyance comes to the turnover conveyance path 31C side of the location of the switching device 33B. The medium long sheet has such a length that is shorter than the very long sheet and that when the trailing end of the medium long sheet in the direction of sheet conveyance is on the turnover conveyance path 31C, the leading end thereof in the direction of sheet conveyance cannot reach the inside of the first drum conveyance device 34, but reaches the second shunt conveyance path 31J and the conveyance roller 32H of the second drum conveyance device 35. The turnover conveyance path 31C can be described also as a shunt conveyance path 31C.

A description will be given of switchback conveyance of a medium long sheet for duplex printing. When the switching device 33B is switched to the side of the arrow K and the switching device 33C is switched to the side of the arrow D, the medium long sheet conveyed from the image forming apparatus 2 is conveyed to the shunt conveyance path 31C, the second shunt conveyance path 31I, and the second shunt conveyance path 31J. The medium long sheet conveyed face-up to the second shunt conveyance path 31J of the second drum conveyance device 35 in the above manner is switched back on the second shunt conveyance path 31J by the conveyance roller 32H.

At this time, when the switching device 33B is switched to the side of the arrow L, the medium long sheet is conveyed in the direction of the arrow U on the long-sheet conveyance path 31M by the conveyance roller 32H, the conveyance roller 32C, and the conveyance roller 32I.

Furthermore, when the switching device 33E is switched to the side of the arrow H, the medium long sheet is conveyed toward the image forming apparatus 2 by the conveyance roller 32F. In the image forming apparatus 2, the conveyance roller 27A conveys the medium long sheet in the direction of the arrow P. Thus, duplex printing can be achieved on the image forming apparatus 2.

Next, a description will be given of a manner of ejection of a medium long sheet in a face-down position with reference to FIG. 2.

The medium long sheet conveyed face-up to the second shunt conveyance path 31J of the second drum conveyance device 35 is switched back on the second shunt conveyance path 31J by the conveyance roller 32H. At this time, as shown in FIG. 2, when the switching device 33B is switched to the side of the arrow L, the medium long sheet is conveyed in the direction of the arrow U on the long-sheet conveyance path 31M by the conveyance roller 32H, the conveyance roller 32C, and the conveyance roller 32I.

Furthermore, when the switching device 33E is switched to the side of the arrow G, the conveyance roller 32G conveys the medium long sheet in the direction of the arrow Q from the second U-turn conveyance path 31L to the ejection conveyance path 31G and then the second ejection conveyance path 31H. Thus, the medium long sheet in a face-down position is ejected to the ejection device 4.

In this embodiment, an image-bearing surface of a long sheet (a very long sheet or a medium long sheet) conveyed from the image forming apparatus 2 can be dried by the drying device 30, which prevents defacement of components of the sheet conveying device 3 even when the long sheet is switched back.

In this embodiment, the above-described width matching device 341 enables long sheets having different buckling strengths to be stably conveyed and switched back.

When, in a sheet conveying device or an image forming apparatus in which a sheet is conveyed, a sheet conveyance path is linear, the conveyance resistance of a sheet is small, but the sheet conveying device or the image forming apparatus has difficulty reducing the size.

The sheet conveying device 3 according to this embodiment can be reduced in size while ensuring the length of the conveyance path.

The description of the embodiment of the present disclosure has so far been given with reference to the drawings. However, the present disclosure is not limited to the above embodiment and can be implemented in various forms without departing from the gist of the present disclosure. For the sake of ease of understanding, the drawings may be schematic representation, primarily of components. The number of components and so on shown in the drawings may be different from those of actual components for convenience of creation of the drawings. The components described in the above embodiment are merely illustrative, not particularly limited, and can be changed variously without substantially departing from the effects of the present disclosure.

INDUSTRIAL APPLICABILITY

The present disclosure is applicable to the field of conveying devices, such as an image forming apparatus.

While the present disclosure has been described in detail with reference to the embodiments thereof, it would be apparent to those skilled in the art the various changes and modifications may be made therein within the scope defined by the appended claims.

What is claimed is:

1. A sheet conveying device comprising:

a sheet conveyance path that receives a long sheet conveyed from an image forming apparatus and allows the long sheet to be further conveyed on the sheet conveyance path;

a turnover conveyance path that diverges from the sheet conveyance path, receives the long sheet conveyed from the sheet conveyance path to turn over the long sheet, and allows the turned-over long sheet to be further conveyed on the turnover conveyance path;

a first shunt conveyance path that is formed to connect to the turnover conveyance path and have a circularly curved shape and allows the long sheet conveyed from the turnover conveyance path to be shunted and switched back on the first shunt conveyance path;

a long-sheet conveyance path that is formed to diverge from the turnover conveyance path connecting to the first shunt conveyance path and allows the long sheet switched back on the first shunt conveyance path to be further conveyed toward a conveyance path leading to the image forming apparatus or toward a conveyance path leading to an ejection device; and a second shunt conveyance path that is formed to connect to the turnover conveyance path, diverge from the turnover conveyance path separately from the first shunt conveyance path, and have a circular curved shape and allows the long sheet conveyed from the turnover conveyance path to be shunted and switched back on the second shunt conveyance path, wherein the long-sheet conveyance path is formed to diverge from the turnover conveyance path connecting to the first shunt conveyance path and the second shunt conveyance path, receives the long sheet switched back on the first shunt conveyance path and the second shunt conveyance path, and allows the long sheet to be further conveyed on the long-sheet conveyance path, wherein the long-sheet conveyance path diverges into:

a first U-turn conveyance path that allows the long sheet switched back on the first shunt conveyance path or the second shunt conveyance path to be conveyed toward the image forming apparatus; and an ejection conveyance path that is formed to have a circular shape along a shape of the first shunt conveyance path and allows the long sheet switched back on the first shunt conveyance path or the second shunt conveyance path to be conveyed toward the ejection device disposed on a side of the sheet conveying device opposite to the image forming apparatus.

2. The sheet conveying device according to claim 1, wherein the first shunt conveyance path and a portion of the ejection conveyance path have a circular shape of the same curvature.

3. A sheet conveying device comprising:

a sheet conveyance path that receives a long sheet conveyed from an image forming apparatus and allows the long sheet to be further conveyed on the sheet conveyance path;

a turnover conveyance path that diverges from the sheet conveyance path, receives the long sheet conveyed from the sheet conveyance path to turn over the long sheet, and allows the turned-over long sheet to be further conveyed on the turnover conveyance path;

a first shunt conveyance path that is formed to connect to the turnover conveyance path and have a circularly curved shape and allows the long sheet conveyed from the turnover conveyance path to be shunted and switched back on the first shunt conveyance path;

a long-sheet conveyance path that is formed to diverge from the turnover conveyance path connecting to the first shunt conveyance path and allows the long sheet switched back on the first shunt conveyance path to be further conveyed toward a conveyance path leading to the image forming apparatus or toward a conveyance path leading to an ejection device; and a second shunt conveyance path that is formed to connect to the turnover conveyance path, diverge from the turnover conveyance path separately from the first shunt conveyance path, and have a circular curved shape and allows the long sheet conveyed from the turnover conveyance path to be shunted and switched back on the second shunt conveyance path, wherein the long-sheet conveyance path is formed to diverge from the turnover conveyance path connecting to the first shunt conveyance path and the second shunt conveyance path, receives the long sheet switched back on the first shunt conveyance path and the second shunt conveyance path, and allows the long sheet to be further conveyed on the long-sheet conveyance path, wherein the first shunt conveyance path and the second shunt conveyance path are disposed below the sheet conveyance path within a range of extension of the sheet conveyance path.

* * * * *